Nov. 1, 1932.  G. R. LIVERGOOD  1,886,343
PIPE ENGAGING DEVICE
Filed March 13, 1928    2 Sheets-Sheet 2
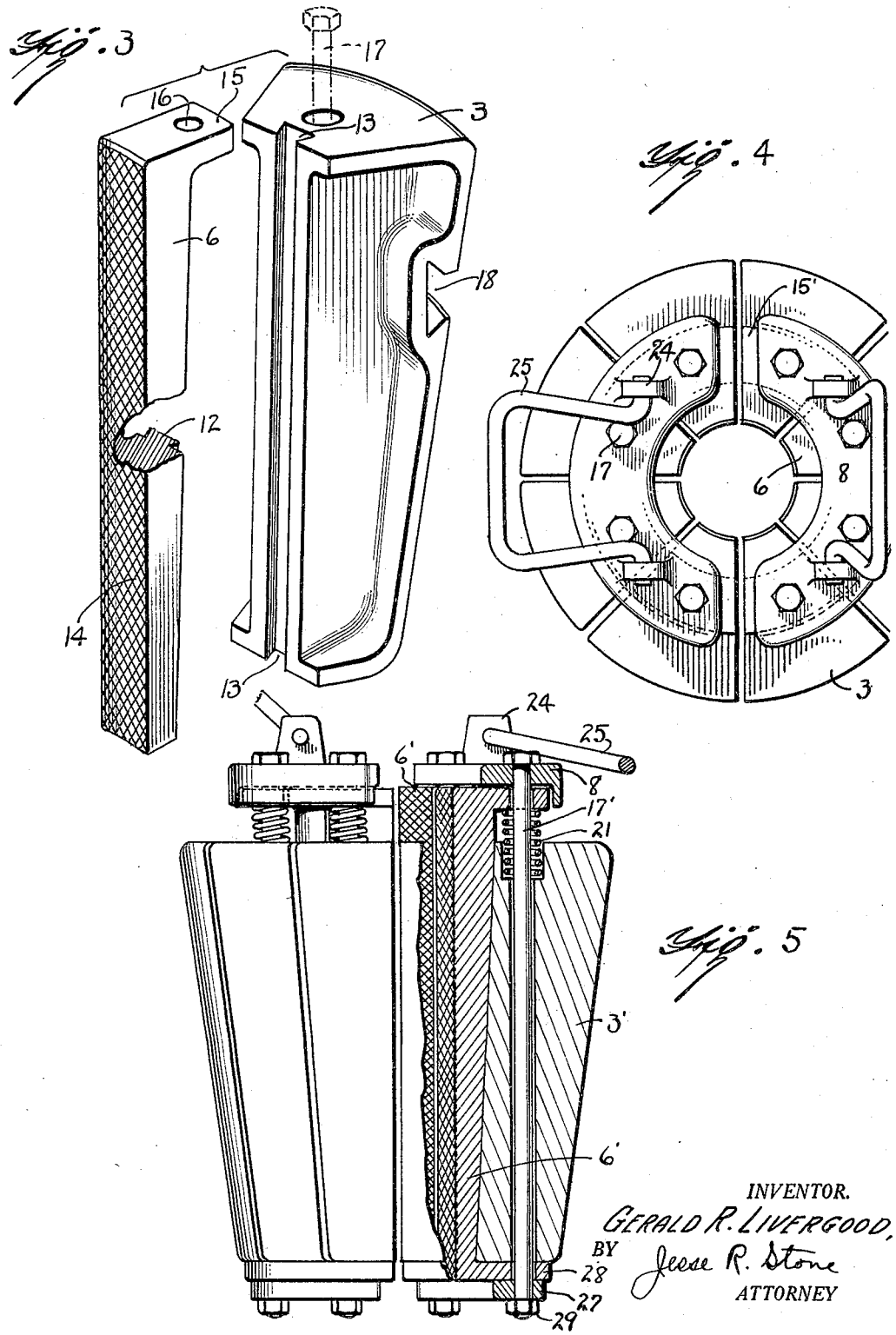
INVENTOR.
GERALD R. LIVERGOOD,
BY Jesse R. Stone
ATTORNEY Patented Nov. 1, 1932

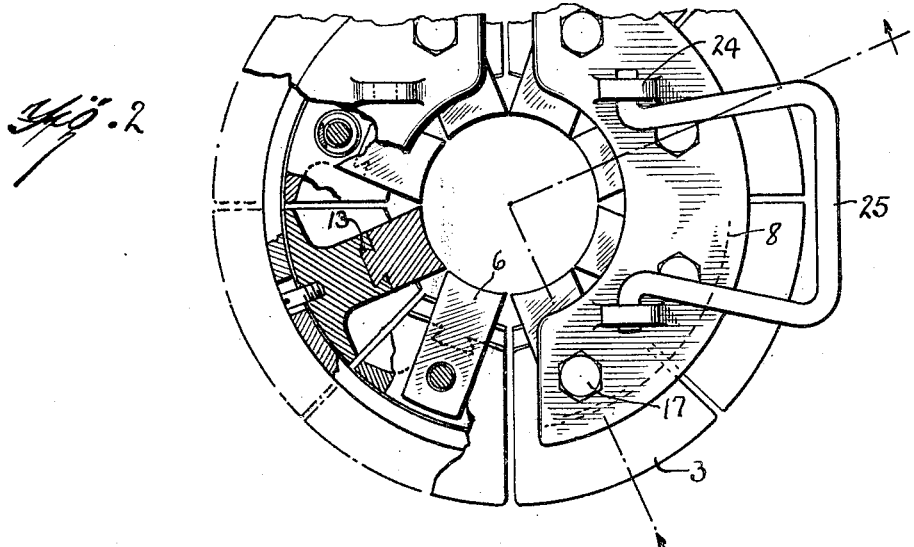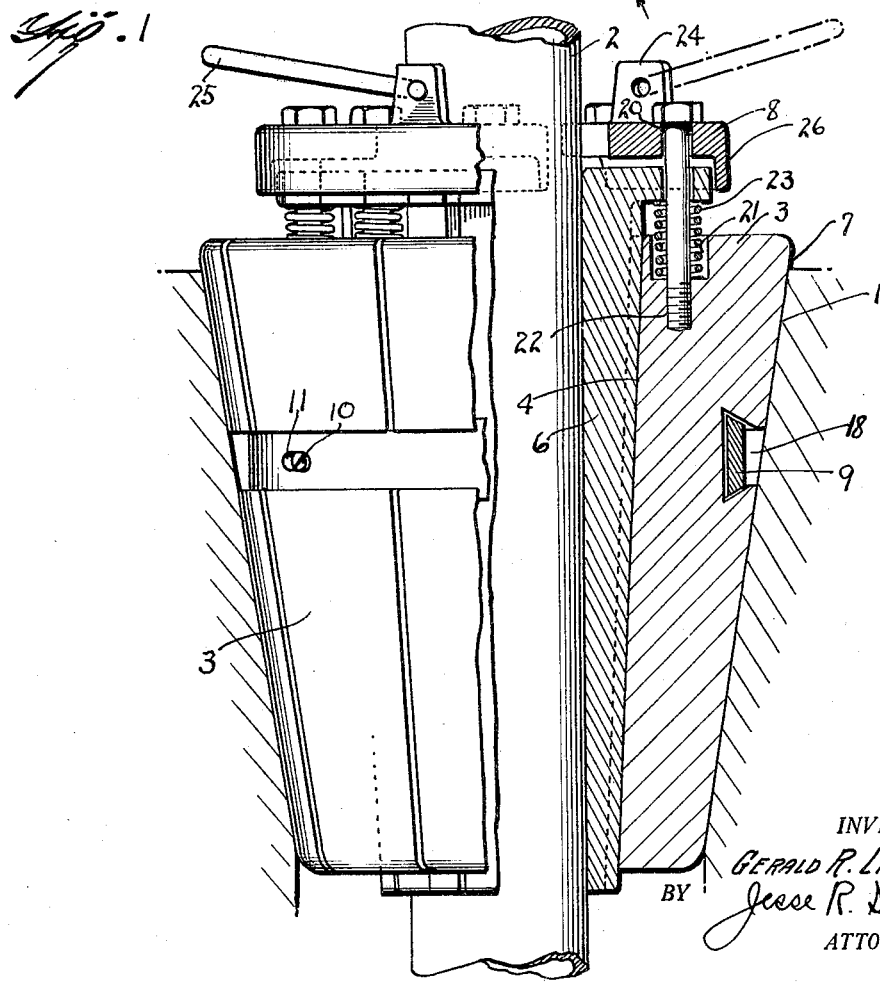

1,886,343

UNITED STATES PATENT OFFICE

GERALD R. LIVERGOOD, OF HOUSTON, TEXAS; MARIE E. LIVERGOOD ADMINISTRATRIX OF ESTATE OF SAID GERALD R. LIVERGOOD, DECEASED

PIPE ENGAGING DEVICE

Application filed March 13, 1928. Serial No. 261,225.

My invention relates to devices for engaging pipe to support the same, and is particularly adapted for use in oil field work, wherein the pipe is supported within the rotary table during the screwing up or unscrewing of the joints of the pipe.

In handling pipe in oil field work, it is usually necessary to support heavy loads, and such supporting devices as are employed for this purpose must be constructed with the object of supporting loads sometimes amounting to forty or fifty tons. In handling heavy pipe of this nature, it sometimes happens that the supporting slips or pipe engaging members are wedged tightly by the tremendous load which they carry within the tapered seat in the rotary table and will not easily release when the slips are to be removed.

It is an object of my invention to provide a slip which will engage the pipe evenly and which will also hold it tightly and release quickly without the necessity of hammering the devices free from the pipe.

It is desired that the structure be made light so that it may be easily handled and that there be a plurality of wedging surfaces so arranged as to perform the function of firmly holding the pipe, and also of quickly releasing the same when the pipe is raised.

The invention resides particularly in the construction and arrangement of the elements making up pipe engaging slips, and such structure will be set out particularly in the specification which follows.

Referring to the drawings herewith, Fig. 1 is a side view, partly in elevation and partly in vertical section, of a pipe engaging device embodying my invention, the same being shown as seated within a rotary bushing.

Fig. 2 is a broken top view of the device shown in Fig. 1, certain parts being broken away to disclose the means for retaining the jaws in assembled position.

Fig. 3 is a perspective view showing the two co-acting parts making up one of the gripping members.

Fig. 4 is a top plan view of a pipe engaging slip, as shown in Fig. 5; and,

Fig. 5 is a side view, partly in elevation and partly in vertical section, illustrating an embodiment of my invention slightly different from that shown in Fig. 1.

In rotary drilling, the pipe or drill stem employed in the drilling operation is adapted to be supported during its coupling or uncoupling of the joints by means of pipe engaging elements ordinarily termed "slips", which are formed to seat or bowl within a tapered seat 1 in a rotary table. The pipe shown at 2 is gripped so as to be supported in the table by means of slips fitting within the tapered seat 1 and wedging between the rotary table and the pipe. Slips of this general character are old in the art and are well known.

In my invention, I employ two slips, each made up of a plurality of arcuate supporting members 3. In the drawings I have shown four of these jaws, on each slip, and two slips in all to surround the pipe. Said members are tapered on their outer surfaces to correspond to the taper of the seat 1, and on their inner faces they are formed with a tapered face 4, which is formed with a dove-tailed mortice 13 therein to receive the pipe engaging jaws 6.

It is to be noted that the taper of the outer face 7 of the supporting members makes a more obtuse angle with the axis of the pipe than does the taper of the inner surface 4. Said morticed slot or recess 13 in the forward face 4 of each of the supporting members is also inclined with the same steep taper as the forward face of the supporting members. The outer faces of the supporting members 3 are formed with a circumferential groove 18 intermediate the ends thereof, said grooves being dove-tailed so as to receive therein a semicircular connecting strap 9 of metal, which is preferably resilient. Said strap 9 is connected with the jaws by means of cap screws 10 extending through the slots 11 in the straps and tending to prevent the movement of the connecting member from the morticed groove in which it is placed.

The jaws 6 are of a comparatively narrow width relative to the supporting members 3, as will be seen from Figs. 2 and 3. Said jaws have tongues 12 thereon shaped to fit within the dove-tailed grooves or keyways 13 in the supporting members 3. The jaws are slightly wider than the grooves 13 and are tapered on their outer faces to fit against the inner faces 4 of said supporting members. Their inner faces are knurled or toothed at 14 to engage the pipe, said inner face being in a vertical position when the slip is placed within the tapered seat. At the upper end of each of the jaws is an outwardly presented flange 15 to engage above the upper end of the supporting jaw 3 and an opening 16 is provided in the said flange 15 to receive a pin or screw 17, which is adapted to be secured within the upper end of the supporting member 3. It is to be understood that the engagement between the jaw and the supporting member 3 is a sufficiently loose one to allow the free vertical sliding movement of the jaw in the supporting member.

To support the different pipe engaging elements in assembled position in a slip, I provide an arcuate plate 8 at the upper end of each slip, said plate extending part way around the said slip, but preferably stopping slightly short of the edges of the two outer jaws, as shown in Figs. 2 and 4. Said plate is connected by means of screws or pins 17 to the jaws 6 and the supporting members 3. Said screws pass loosely through openings 20 in the plate and through the openings 16 in the flanges of the jaws and extend downwardly into recesses 21 in the supporting members and are screwed within threaded openings 22 in the bottoms of said recesses. The pin is of smaller size than the opening 16 so that a free movement of the pin in the opening is possible. Between the bottoms of the recesses 21 and the flanges 15 of the jaws are secured coiled springs 23, which are of sufficient strength to ordinarily support the jaws in the position elevated above the supporting members 3, as will be noted from Fig. 1.

On the upper sides of each of the plates 8 is a pair of upwardly extending lugs 24, which are perforated to receive a handle 25, the lower ends of which are bent laterally to engage within said perforations and thus provide a hinged handle by means of which the slips may be manipulated. On the outer margin of each of the arcuate plates 8 is a downwardly presented flange 26, which extends slightly beyond the outer margin of the flanges 15 and tends to limit their rotative movement upon the pins 17.

In the operation of this slip, there are ordinarily two helpers upon the derrick platform, and each of them will handle one of the multiple jaw slips herein described. The slip will be dropped within the tapered seat 1 of the rotary about the pipe and the lowering of the pipe thereafter will cause the wedging of the slip between the seat and the pipe. As the outer supporting members 3 are lowered within the tapered seat, they will be forced inwardly so as to move the jaws 6 into contact with the pipe. The downward movement of the pipe will then force the jaws 6 and the supports 3 farther downwardly and the steep taper between the jaw and the supporting element 3 will cause a tight wedging of the jaw between the supporting slip and the pipe, so that the pipe will be firmly held. The spring 23 will function to hold the jaw 6 in position above the supporting slip 3 until the pipe is engaged and the weight of the pipe will thereafter wedge the jaw between the slip member 3 and the pipe. When the pipe is to be released, the said pipe will be raised somewhat and because of the more obtuse angle of engagement between the slip and the seat 1, there will be a ready release along that surface, and when the slip has been raised from the seat, the outer supporting members will release the wedging hold upon the jaw 6 and the said jaw will also release. As the device is raised upwardly, the spring will again act to place the jaw in proper position above the supporting element 3. It will be seen that the spring 23 has the function of holding the jaw in position raised above the supporting member 3, so that when the slip is placed in the tapered seat in the rotary, there will be sufficient play between the jaw and the supporting element to allow a relative vertical movement between them after the outer supporting member has been seated.

In the smaller sizes of drill stem where there is sufficient space to allow the use of a bottom plate upon the slip, I may substitute for the holding member 9 a bottom plate 27 to correspond with the upper plate 8. This structure is shown in Fig. 5. The upper portions of the slips are similar in all respects to the slips shown in Figs. 1 to 3 inclusive. At the lower end, however, the inner jaws 6' are provided with an outwardly extending flange 28 which fits below the outer supporting jaws 3', and below this flange is the arcuate plate 27.

Another point of difference is that the pins or bolts 17' extend entirely through the outer supporting members 3' and through the lower flange 28 and plate 27 and have nuts 29 thereon. The two plates 8 and 27, together with the connecting rods or bolts 17', form a cage upon which the jaws 6' and the supporting elements 3' are loosely and flexibly mounted. It will be noted in this embodiment that when the inner jaw 6' moves downwardly relative to the outer supporting element 3', the cage including the upper and lower plate will move with the jaw against the action of the springs 21, and that when the slip is raised up by means of the handle, the action will be to draw the cage upwardly to engage beneath the jaws and enable the slips to be withdrawn, as previously described.

This type of slip will be adapted for use in the smaller sizes of pipe and can be made shorter in length than the slip previously described.

The advantages of this type of device lie in the fact that with a plurality of jaws in each slip, there is an even and firm engagement of the jaws about the pipe which cannot be obtained by slips having a fewer number of jaws. The use of the slip having my quick releasing means not only enables the slips to be handled more rapidly and without difficulty, but also assures a firm hold upon the pipe, due to the better wedging action, so that there will be little danger of dropping the pipe in the well.

Having thus described my invention, what I claim as new is:

1. A pipe engaging device including a plurality of outer segmental supporting members, tapered downwardly on their outer faces to fit releasably within a tapered bowl, their inner faces being tapered on a more acute angle to the vertical than said outer faces, longitudinally slidable pipe engaging jaws of greater length than said members and shaped to fit on said inner faces, and means whereby said members and said jaws may be moved as a unit.

2. A pipe engaging device including a plurality of outer segmental supporting members, tapered downwardly on their outer faces to fit releasably within a tapered bowl, their inner faces being tapered on a more acute angle to the vertical than said outer faces, pipe engaging jaws shaped to fit on said inner faces, means securing said jaws to said members for longitudinal sliding movement thereon, and means whereby said members and said jaws may be moved as a unit, said jaws being of greater length than said members.

3. A pipe engaging device including a plurality of outer segmental supporting members, tapered downwardly on their outer faces to fit releasably within a tapered bowl, their inner faces being tapered on a more acute angle to the vertical than said outer faces, pipe engaging jaws shaped to fit on said inner faces, means securing said jaws to said members for longitudinal sliding movement thereon, means whereby said members may be moved as a unit, and means normally supporting said jaws in raised position in said members.

4. In combination with a downwardly tapered bowl, a plurality of segmental supporting members shaped to fit said bowl, the inner faces of said members having a more acute angle relative to the vertical than the taper of said bowl, pipe engaging jaws on said members, means to hold said jaws slidable normally upward on said members, and means securing said members loosely together.

5. In combination with a downwardly tapered bowl, a plurality of segmental supporting members shaped to fit said bowl, the inner faces of said members having a more acute angle relative to the vertical than the taper of said bowl, pipe engaging jaws on said members, means to hold said jaws normally upward on said members, means securing said members loosely together comprising an upper plate secured to said jaws and members, and a resilient member connecting said members between their ends.

6. In a pipe sustaining device including a downwardly tapered bowl, a plurality of slips adapted to fit within said bowl and engage a pipe, each slip comprising a plurality of segmental supporting members having a comparatively obtuse releasing taper on their outer faces and a steep wedging taper on their inner faces, jaws slidable relative to said members to wedge between the same and the pipe, springs in the upper ends of said supporting members tending to hold said jaws relatively upward, and means to hold the members of each slip loosely together as a unit.

In testimony whereof I hereunto affix my signature this 8th day of March, A. D. 1928.

GERALD R. LIVERGOOD.